UNITED STATES PATENT OFFICE.

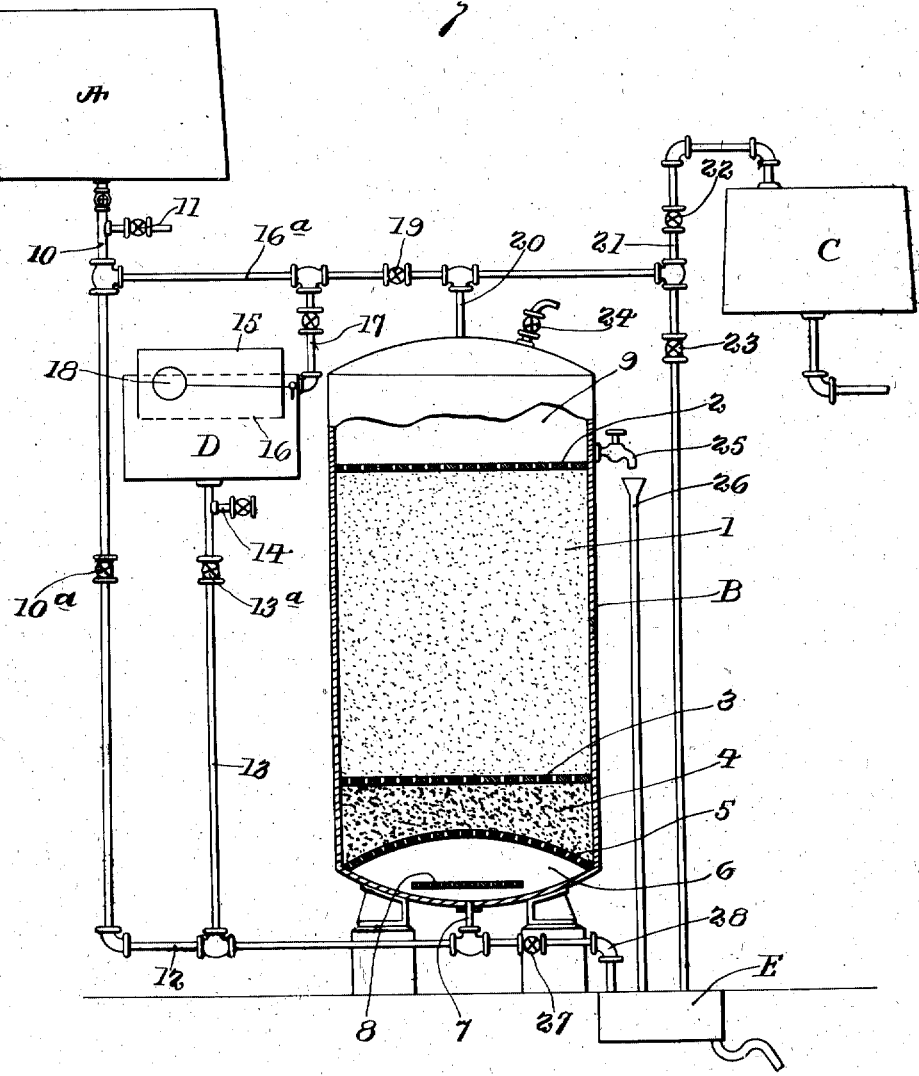

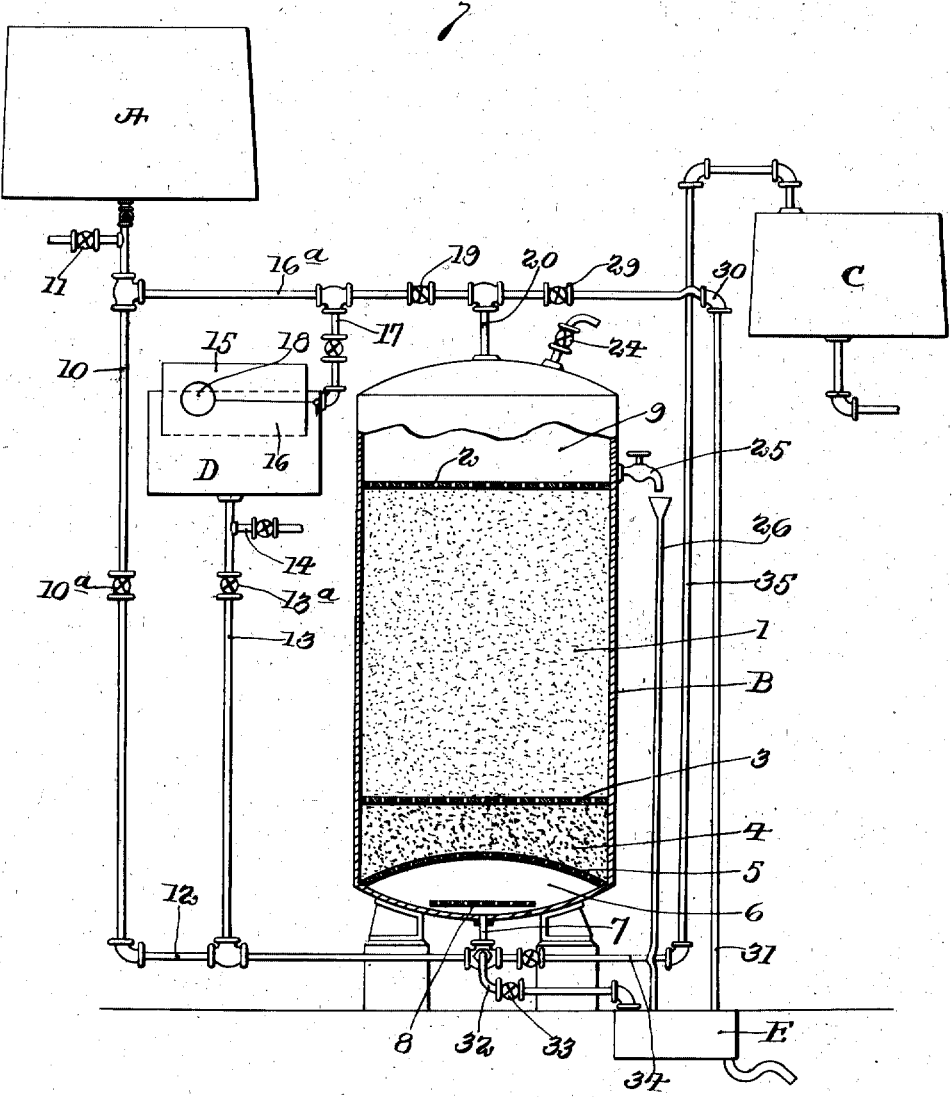

THOMAS R. DUGGAN, OF NEW YORK, N. Y., ASSIGNOR TO THE PERMUTIT COMPANY, OF NEW YORK, N. Y., A CORPORATION OF DELAWARE.

METHOD OF AND APPARATUS FOR SOFTENING WATER.

1,276,629.     Specification of Letters Patent.     Patented Aug. 20, 1918.

Application filed October 23, 1916. Serial No. 127,127.

*To all whom it may concern:*

Be it known that I, THOMAS R. DUGGAN, a citizen of Great Britain, residing at New York, in the county of New York and State of New York, have invented certain new and useful Improvements in Methods of and Apparatus for Softening Water, of which the following is a specification.

This invention relates to methods of and apparatus for softening water; and it comprises a method of utilizing the activity of exchange silicates to a greater extent than is now the case and of quickly revivifying the same with good utilization of revivifying solutions; and it also comprises certain apparatus with connections adapted for the performance of this method; all as more fully hereinafter set forth and as claimed.

In the method of softening water by the use of exchange silicates which is now well known, water to be softened is passed through certain materials containing silica and alumina (or another amphoteric oxid, such as titanium oxid, iron oxid, chromium oxid, tin oxid, zinc oxid, etc.), alkali and water. These materials are used in the form of small hard granules which are employed as a granular bed.

On the passage of hard water through the bed of granules, the lime and magnesia compounds, to which the water owes its hardness, are taken up by the exchange silicate, alkali compounds going into solution in their lieu. After a period of use when the exchange silicate has taken up a certain amount of lime and magnesia, it is revivified by passing a solution of sodium chlorid (common salt) through the bed. The lime and magnesia now go into solution as calcium and magnesium chlorids and the exchange silicate takes up alkali again so that it is ready for re-use.

In large measure, the amount of exchange action which is possible depends upon the operative amount of surface offered to the water flowing through a bed or mass of granules. The water tends more or less to follow channels; and in so doing, of course, certain surfaces are more exposed to water than others and the time of operativeness, that is, the time before regeneration is necessary, depends upon the time of operation of the more exposed faces. The channeling difficulties are more accentuated where the flow of water to be softened is down through the bed than where the flow is upward.

The considerations which apply to the direction of flow of the water to be softened through the bed apply also to the flow of salt solution in regeneration; there is the same tendency to channeling and preferential passage at one point rather than at another.

Ordinarily, the water to be softened is passed through the bed in a downward direction and the salt solution in revivifying is also passed downward. In so doing, the flow of the liquid and gravitation coöperate to keep the granules in place; and the result is that, to a greater or less extent, the described preferential passage of water or liquid at some points rather than at others is favored. In the case of any given group of granules, the flow is apt to be greater past some granules and some granule surfaces, than past others.

An upward passage of water in the softening phase of the apparatus avoids in large measure these difficulties, giving a greater period of activity since the buoying action of the current keeps the granules apart and prevents packing and channeling, but this sometimes brings new difficulties; and particularly where the water is cold and the filter warm or where the exchange silicate is light and bulky. On warming up, the water is apt to liberate air bubbles which cling to the granules and tend to lift them. The tendency to lift is of course less with the denser varieties of silicates, but these do not give as much active surface as the lighter. With light granules, bad design of apparatus, and water which warms up materially in going through the apparatus there may be a relatively serious loss of silicates due to flotation and exit of granules with the softened water. Whatever be the direction of flow of water in the softening phase, however, I find certain advantages are gained by an upward flow of salt solution in the regenerating phase. With the relatively heavy salt solution passing in an upward direction the relative movement of the granules with regard to each other is more pronounced than it is with a similar flow of water; and uniform passage of the salt solution takes place.

In revivification, it is found that the main part of the absorbed bases will be removed by the salt solution after the regenerating liquid has been supplied to and passed through the layer in an amount equal to or larger than that amount of liquid which can be stored in the spaces between the granules. Or, in other words, the liquid occurring between the granules must be displaced once or twice by the salt solution in order to remove the main part of the bases absorbed by the exchange silicate. Repassage of the used salt solution through the bed does little good and may do harm, since such a solution will only take up a certain amount of calcium or magnesium before losing regenerating power. When in softening the water flows downward and the salt solution passes upward, the lower layers of silicates are completely revived first and it is inexpedient to bring back contaminated brine into contact therewith again. It is desirable in regeneration to bring the clean or uncontaminated salt solution first into contact with the most active or least contaminated layers of silicates.

After the revivifying solution has been used on the exchange silicate, such solution must, as already stated, be removed to prevent the contamination of the water next to be treated. In one way, giving a good utilization of the salt solution, I can gradually admit fresh water at the bottom of the mass, drawing off from a point above; the admission of water being finally stopped and the residual liquid in the bed then removed by draining from the bottom. It is advantageous to choose the amount of water in which the regenerating salt is dissolved, so that the main part of the absorbed bases is taken into solution and taken away before fresh water is introduced. Other ways of removing the salt solution than that indicated may be used; but the described way is economical and practical, since the whole amount of regenerating liquid is well utilized; but any other suitable way may be used. Care should however be taken that repassage of contaminated salt solution through the revived or partially revived bed is avoided.

In the accompanying illustration I have shown, more or less diagrammatically, certain embodiments of apparatus within the present invention and susceptible of use in the described process. In this showing, Figure 1 is a view, partly in elevation and partly in vertical section, of a type of apparatus in which both the water to be softened and the revivifying solution pass through the silicate bed in an upward direction; and Fig. 2 is a similar view of a modified structure wherein the flow of water to be softened is normally downward while that of the regenerating solution is, as before, upward. In both figures like reference characters define like parts.

In the structure of Fig. 1, element A, is a tank, pipe or other source of water to be softened and treated, while D is a tank, pipe or other source of salt solution. As shown in Fig. 1, A is a tank. B is a casing for containing the bed of exchange silicates and C is a pipe, tank or other arrangement for removing or receiving softened water. E is a diagrammatically shown sewer connection.

In Fig. 1 casing B contains a layer or bed 1 of exchange silicates. As shown, this layer is kept in position by an upper perforated cross-plate 2 and a lower perforated cross-plate 3, although the use of these plates is not necessary. Below the lower cross-plate is a layer 4 of gravel or the like. The granular silicates may rest directly on this gravel layer instead of being separated therefrom by the plate. And the gravel layer may be dispensed with. Below this layer is another cross-plate 5, which may be replaced by a strainer system or any other suitable structure. Below this cross-plate is open chamber 6 with pipe connection 7 at its lowest point. Baffle 8 is arranged above this pipe connection in order to give an even distribution of the liquid. Above the upper cross-plate is an empty chamber 9. Leading from tank A is water pipe 10 provided with valve 10ᵃ. Valved inlet 11 may be used in lieu of tank A as a source of water to be softened. This pipe 10 extends downwardly to a cross-connection 12 communicating with the casing B at the lowest point. Leading from this cross-connection is another valved pipe 13 leading to tank D for salt solution. In lieu of tank D, salt solution may be brought from another source through valved inlet 14. As shown, tank D is provided with a salt box 15 having perforated bottom 16. Also leading from the water supply pipe is another cross pipe 16ᵃ provided with valved outlet pipe 17 leading to the tank D for salt solution. As shown, this pipe is also provided with a float valve 18. Beyond this valved outlet pipe (17) in the upper cross pipe is valve 19 and beyond this again is a down pipe 20 leading into the top of casing B. The upper cross pipe beyond this down pipe is prolonged to enter soft water pipe 21. As shown, this soft water pipe has valves 22 and 23, located respectively on each side of the point of inlet of the upper cross pipe. Beyond the lower valve 23 the pipe is prolonged downwardly to the sewer connection E. On the top of the casing B is a valved outlet connection 24 and just above the upper cross-plate is valved waste outlet 25 ending above open pipe 26 which also leads to the sewer connection. The lowermost cross pipe (12) beyond the point of connection 13 with the bottom of the casing B is valved at 27 and has a connection 28 leading to the sewer connection E.

In the structure shown in Fig. 2 the upper cross-pipe is provided with a valve 29 beyond which it extends to special connection 30 and 31 leading down to the sewer connection E. The lower cross pipe (12) has the same connection entering the bottom of the casing B but at this point it has another connection 32 leading past valve 33 to the sewer connection E. Another valved connection 34 leads through pipe 35 to tank C for softened water.

In the use of the structure of Fig. 1, the exchange silicate 1, being supposed to be revived and in condition to soften hard water, such hard water is led in from pipe 11 or tank A and passes through 10 and 12 to 7 whence it passes upward through the layer of gravel or sand and the layer of exchange silicates to 20 and thence through 21, valve 22 being open, to tank C, whence it goes to a place of use. After a time the activity of the exchange silicate 1 will be lessened and it will be necessary to revive. At this time valve 10$^a$ is closed and the valve in 17 is opened, box 15 being supplied with the requisite amount of salt. An amount of water controlled by float valve 18 enters D and dissolves the salt in the salt box. Brine from another source may of course be supplied through pipe 14. The salt solution passes downward through 13 and enters the bottom of the casing B at 7 thence flowing upward to exit at 25, displacing the water before it as it goes and revivifying the exchange silicate. When the amount of salt solution desirable has been passed through, valve 13$^a$ in pipe 13 is closed and 10$^a$ opened. Water flows through 10, 12 and 7 entering the casing at its lowest point and flowing upward to 25, displacing and removing the salt solution as it goes. This passage of water in this direction may be continued until all the salt solution has been displaced. Or valve 24 may be opened to allow air to enter, valve 10$^a$ closed and valve 27 opened allowing the liquid in the bed to flow downward through the mass and go to exit at 7 and 28. It will be noted that 7 communicates with B at the lowest portion of the casing so as to insure a positive draining with removal of all water containing salt. If desired, the valve 24 being closed, 19 may be opened and a supply of fresh water sent through the mass downwardly for washing purposes. The exchange silicate being now revived and washed is ready for another water softening phase as before. In the water softening operation the lower body of sand or gravel 4 and the perforated plates 3 and 5 catch most of the mechanical impurities and the final downward washing to get rid of the salt solution also serves for back washing. Mechanical impurities go out through 7 and 28 to the sewer.

In the operation of the structure of Fig. 2, the flow of the water to be softened is normally downward, while that of the regenerating solution is, as before, upward. In the operation of this structure, presuming the exchange silicate to be regenerated and ready for operation, water from 11 or A passes through 16$^a$ and 20, valve 19 being open, into chamber 9, and thence through the silicate bed 1 downward to 7. From 7 the softened water passes through 34 and 35 to C. When the exchange silicate needs regeneration, the flow of water through the apparatus is stopped and salt solution prepared in D (or supplied from 14) as before. This salt solution passes downward through 13 (valves 10$^a$ and 19 being closed) and into the bottom of the casing B through 7. The salt solution passes upward through silicates 1 to 25 and thence through 26 to waste as before.

In flushing with either form of apparatus shown, wash water may of course be sent through the salt line shown coming through line 16$^a$ and pipe 17 past valve 18 into D and thence downwardly through 13, past valve 13$^a$ into the bottom of the casing B through pipe 7. In so doing, a simple manner of operation is afforded since the necessary quantity of salt may be put into box 15 and then the water allowed to flow. The water at first forms the strong salt solution necessary for reviving and then passes this salt solution upwardly through the silicates to waste at 25 and then washes the whole apparatus.

In the operation of the structure of Fig. 1, the salt solution and the water pass through the mass in the same direction; while in the operation of the structure of Fig. 2, the flow of the water to be purified and that of the regenerating salt solution, are in opposed directions. With an upward passage of both liquids as shown in Fig. 1, the advantages of a buoying action during softening as well as during regeneration, are secured; while in the case of Fig. 2, the advantage described due to the entry of the two liquids at opposite faces of the mass of exchange silicate is secured together with a buoying action during regeneration only. Which of the advantages mentioned or of their combinations affords the most economical and most practical operation depends upon prevailing conditions.

With an operation such as that of Fig. 2, the dissolved impurities in the water to which it owes its hardness (lime or magnesia or both) mainly accumulate in the face of the bed at which the water enters (in this case, the top face. On now passing salt solution through from the opposite face, this salt solution, which is of course substantially free of lime and magnesia, passes first through the little contaminated portion of the bed and then into contact with the contaminated portion, there taking up the lime and magnesia. As the flow continues, the dissolved lime and magnesia are carried away from the bed and do not reenter it.

What I claim is:—

1. The process of regenerating after use a bed of water softening exchange silicates containing lime or magnesia, which comprises passing a salt solution through said bed in an upward direction as long as said salt solution continues to dissolve and remove substantial amounts of lime or magnesia, and drawing off the contaminated solution after a single passage through the bed.

2. The process of regenerating after use a bed of water softening exchange silicates containing lime or magnesia, which comprises passing a salt solution through said bed in an upward direction as long as said salt solution continues to dissolve and remove substantial amounts of lime or magnesia, and drawing off the contaminated solution at or near the surface of the bed after a single passage through the bed.

3. The process of regenerating after use a bed of water softening exchange silicates containing lime or magnesia, which comprises passing a salt solution through said bed in an upward direction, drawing off the contaminated solution after a single passage through the bed, such drawing off being continued until the solution has substantially ceased to remove lime or magnesia, and then flushing out the residue of the solution.

4. The process of regenerating after use a bed of water softening exchange silicates containing lime or magnesia, which comprises passing a salt solution through the bed in an upward direction, drawing off the contaminated solution at or near the surface of the bed after a single passage through the bed, such drawing off being continued until the solution has substantially ceased to remove lime or magnesia, and then flushing out the residue of the solution.

5. The process of regenerating after use a bed of water softening exchange silicates, through which the water to be softened has passed downwardly, which comprises passing a salt solution through the bed in an upward direction and drawing off the contaminated solution after a single passage through the bed.

6. The process of regenerating after use a bed of water softening exchange silicates through which the water to be softened has passed downwardly, which comprises passing a salt solution through the bed in an upward direction, drawing off the contaminated solution after a single passage through the bed such drawing off being continued until the solution has substantially ceased to remove lime or magnesia, and then flushing out the residue of the solution.

7. The process of regenerating after use a bed of water softening exchange silicates through which the water to be softened has passed downwardly, which comprises passing a salt solution through the bed in an upward direction, drawing off the contaminated solution at or near the surface of the bed after a single passage through the bed, such drawing off being continued until the solution has substantially ceased to remove lime or magnesia, and then flushing out the residue of the solution.

8. The process of regenerating after use a bed of water softening exchange silicates, which comprises passing salt solution through the bed in a direction opposite to that in which the water flowed through the bed during softening, whereby the active salt solution contacts first with the least contaminated portion of the bed, and drawing off the contaminated solution after a single passage through the bed, so that contaminated salt solution does not contact with relatively uncontaminated portions of said bed.

9. The process of regenerating after use a bed of water softening exchange silicates, which comprises passing salt solution through the bed in a direction opposite to that in which the water flowed during use, drawing off the contaminated solution after a single passage through the bed, such drawing off being continued until such solution has substantially ceased to remove lime or magnesia, and then flushing out the residue of the solution.

10. In the purification and softening of water, the process which comprises transmitting water downwardly through a granular bed of exchange silicates until such silicates have functioned to a sufficient degree, thereupon passing salt solution followed by wash water through such bed in an upward direction with removal of salt solution and wash water at or above the upper face of such bed until the silicates are regenerated, interrupting the flow at this time and draining the bed from the lowest point, and once more passing water to be softened through the bed in a downward direction.

11. In a water softening apparatus a casing, a bed of granular exchange silicates therein, means for passing water to be softened through such bed and means connected to such casing for passing salt solution therethrough upwardly with means above such bed for removing the salt solution, and means for passing water following after and displacing such salt solution to the point of removal of the salt solution, such means being connected so as to remove substantially all the solution from the casing.

12. In a water softening apparatus, a casing, a bed of exchange silicates therein, means for transmitting water to be softened through such bed and means for passing salt solution through the bed upwardly to a point of outlet above such bed, means for washing out the salt solution and means connected to the lowest point of the casing leading to a place of disposition for removing the water used in such washing out.

In testimony whereof I affix my signature.

THO. R. DUGGAN.